L. W. ANDRES & M. ANDRES.
FILTER.
APPLICATION FILED APR. 9, 1909.
938,947.
Patented Nov. 2, 1909.
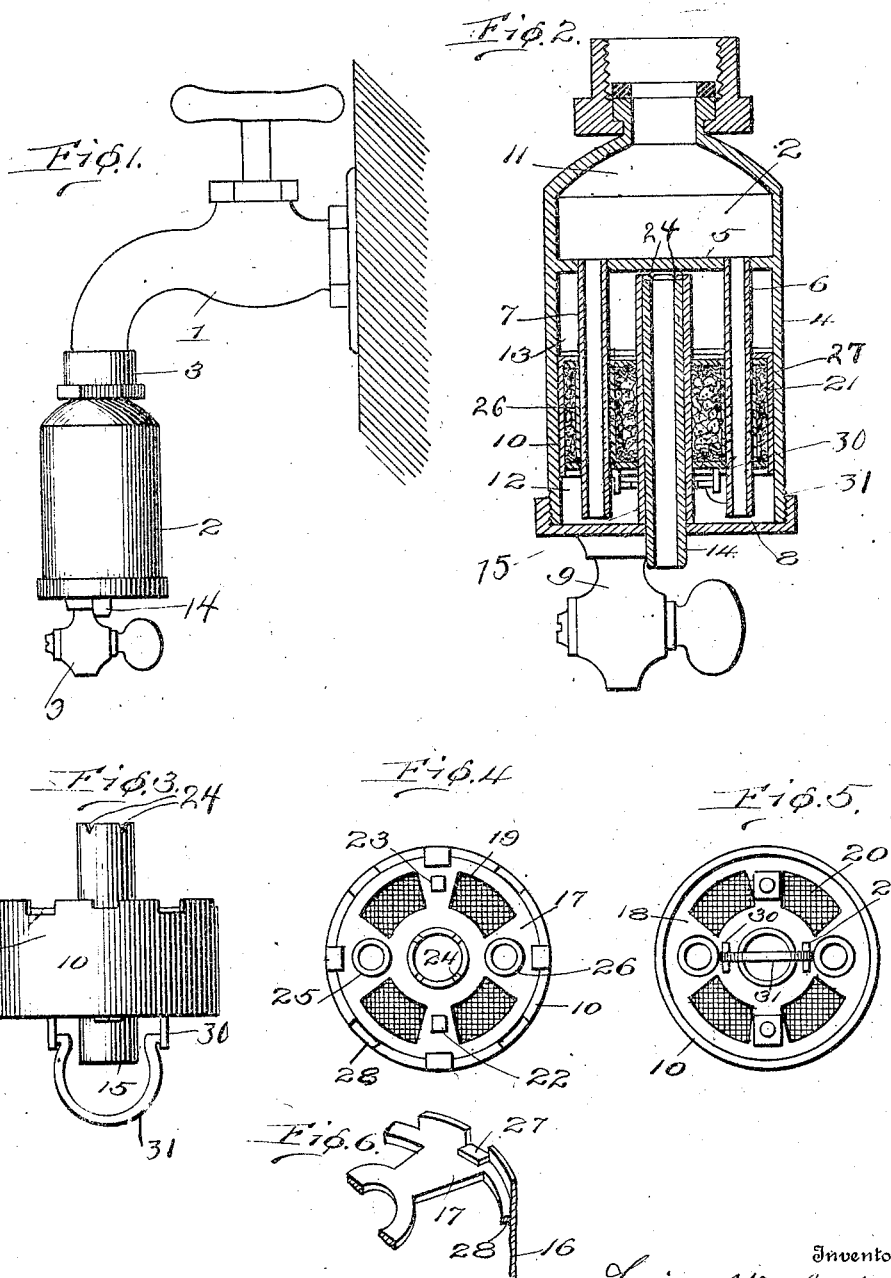
Inventors
Louies W. Andres
Martin Andres
Witnesses

UNITED STATES PATENT OFFICE.

LOUIES W. ANDRES AND MARTIN ANDRÉS, OF SCRANTON, PENNSYLVANIA.

FILTER.

938,947.   Specification of Letters Patent.   Patented Nov. 2, 1909.

Application filed April 9, 1909. Serial No. 488,951.

*To all whom it may concern:*

Be it known that we, LOUIES W. ANDRES and MARTIN ANDRÉS, citizens of the United States, residing at Scranton, in the county of Lackawanna and State of Pennsylvania, have invented certain new and useful Improvements in Filters; and we do hereby declare the following to be a full, clear, and exact description of the invention, such as will enable others skilled in the art to which it appertains to make and use the same.

This invention relates to improvements in filters, and particularly to filters arranged to be applied to spigots or faucets for filtering water immediately previous to its discharge.

The object in view is the arrangement of a plurality of means within a suitable housing including a filtering medium by which water is forced gradually through a filtering surface from a comparatively large body of water so as to take advantage of any settlement of foreign matter therein previous to the passage of the water through the filtering medium.

Another object of the invention is the arrangement of a housing adapted to be removably secured to a spigot in which is provided a filtering medium, a plurality of tubes some of which project downward into the filtering medium and others of which project upward through the filtering medium whereby the unfiltered water is caused to pass downward through the filtering medium without contacting therewith, then back through the filtering medium and in contact therewith for separating any foreign matter from the water after which the water is permitted to escape into a discharge pipe.

A further object of the invention is the arrangement of a filter designed to have a filtering medium that may be readily removed from the casing of the filter proper for cleaning or inspecting as occasion may require, and then placed back in position without injury to any of the parts.

With these and other objects in view the invention comprises certain novel constructions, combinations and arrangement of parts as will be hereinafter more fully described and claimed.

In the accompanying drawings: Figure 1 is a side elevation of a spigot having a filter embodying the invention connected therewith. Fig. 2 is an enlarged vertical section through the filter shown in Fig. 1. Fig. 3 is a side elevation of the filtering member proper. Fig. 4 is a top plan view of the filtering member shown in Fig. 3. Fig. 5 is a bottom plan view of the filtering member shown in Fig. 3. Fig. 6 is a detail fragmentary perspective view of the top plate of a filtering member and surrounding parts, the same showing how the plate is held in position.

Referring to the drawing by numerals, 1 indicates a spigot of any desired kind to which is secured a filter 2 by any desired means, as for instance a nut 3. The filter 2 is formed with a housing 4 having a partition 5 mounted therein which carries pipes or tubes 6 and 7. The pipes or tubes 6 and 7 extend to near the lower end of the housing 4 so as to be in proximity to the cap or bottom 8 which is preferably threaded onto housing 4. Cap 8 carries a relief or cleaning spigot 9 which is adapted to clean out any sediments or dirt lodged below filtering member 10. Above partition 5 is provided a chamber 11 in which a quantity of water is maintained and from which water is supplied to a lower chamber 12 through pipes 6 and 7. Lower chamber 12 is merely the space in housing 4 between cap 8 and filtering member 10. A third chamber 13 is positioned above the filtering member 10 for receiving filtered water from which the same escapes through discharge pipe 14 when the spigot 1 is turned on and the water is flowing.

The filtering member 10 may be held in the housing 4 by friction, but if the friction is not sufficient the same is supported by a tube 15 resting upon cap 8.

The filtering member 10 is formed with a cylindrical housing 16 and end plates 17 and 18 which hold in place wire mesh 19 and 20 of any desired kind or number. The wire mesh may be of several thicknesses as desired, and positioned centrally of the housing 16 is a filtering medium 21 of any desired kind. Plates 17 and 18 are preferably held properly in housing 16 by means of suitable bolts 22 and 23 that pass the full length of the filter. In order to properly hold tube 15 in position in the filter the same is secured to plate 17 preferably by being soldered thereto and is formed with a plurality of notches 24 for permitting the escape of water therethrough in case the tube 15 should be forced against the partition 5. In order to accommodate tubes 6 and 7, tubes 25 and 26 are rigidly secured to plate 17 and extend entirely through the filtering member 10 so that the latter may be placed in housing 4 and removed therefrom without danger of injury. In order to hold plate 17 in the tubular housing 16 the end thereof has bent over portions 27 and 28, 27 overlapping plate 17 and 28 underlapping or projecting beneath plate 17. The top plate 17 is also provided with a pair of upstanding ears 29 and 30 to which the ends of the bail 31 are pivotally secured. Bail 31 is arranged to be folded down against or near plate 17 when the filtering member 10 is placed in housing 4 but is easily raised for use in removing the filtering member from its housing.

In operation when it is desired to secure some filtered water all that is necessary is to turn on spigot 1 and water will flow into chamber 11 and from chamber 11 the water will flow through pipes 6 and 7 into chamber 12. From chamber 12 the water percolates or passes through filtering member 10 and is filtered thereby. After passing through filtering member 10 the water fills chamber 13 from which it overflows into discharge pipe 14. After the filter has once been filled with water filtered water will flow therefrom immediately upon turning on spigot 1, but the fresh water turned on will pass through the filter as just set forth. When the water reaches chamber 12 the water is in the same condition as when leaving spigot 1, but by reason of the sides of chamber 12 the movement of the water is checked, and any comparatively large solid matter therein will be precipitated. Any foreign matter not precipitated will be either checked by the wire mesh of the filter or the remaining filtering medium so that as the water passes into chamber 13 the same is purified. In continuous use it will be observed that sediment and dirt of various kinds will accumulate in chamber 12. This dirt may be cleaned out by simply turning on valve 9 and spigot 1 which will permit the water to freely pass from spigot 1 into chamber 12 and thence out valve 9, the water being compelled to pass through filtering member 10. The water passing this way has considerable movement which will stir up any sediment or dirt in chamber 12 and wash the same out. If for any reason the filter is not cleaned properly by simply turning on valve 9 and spigot 1 the cap 8 may be removed and the filtering member 10 removed for cleaning or repairing as desired.

What we claim is:

1. In a filter the combination with a chamber provided near its upper end with a partition, of a filtering member arranged therein and embodying a casing, plates for closing the ends of the casing, each plate being provided with a plurality of openings, a filtering medium confined between the plates, tubes rigid with the plates, a plurality of pipes opening through the partition and passing through the tubes and terminating short of the bottom of the chamber, and a third tube passing through the center of the plates and projecting at each end beyond the same and extending through the bottom of the chamber.

2. In a filter, the combination with a chamber provided near its upper end with a partition, of a filtering member arranged therein and embodying a casing, plates for closing the ends of the casing, each plate being provided with a plurality of openings, screens for covering the openings, a filtering medium confined between the plates, tubes rigid with the plates, a plurality of pipes opening through the partition and passing through the tubes and terminating short of the bottom of the chamber, and a third tube passing through the center of the plates and projecting at each end beyond the same and extending through the bottom of the chamber.

In testimony whereof we affix our signatures in presence of two witnesses.

LOUIES W. ANDRES.
MARTIN ANDRES.

Witnesses:
W. W. BAYLOR,
J. M. SHEFFIELD.